United States Patent [19]
Henderson et al.

[11] Patent Number: 5,311,515
[45] Date of Patent: May 10, 1994

[54] METHOD AND APPARATUS FOR THE CONTROL OF LOCAL AREA NETWORK MULTI-STATION ACCESS UNITS

[75] Inventors: Gordon J. Henderson, Plymouth; Evan L. Carew, Dearborn; Todd A. Theisen, Grosse Lle; Michael W. Ehn, Dexter, all of Mich.

[73] Assignee: Sim Ware, Incorporated, Livonia, Mich.

[21] Appl. No.: 832,819

[22] Filed: Feb. 7, 1992

[51] Int. Cl.$^5$ ............................ H04J 3/02; H04Q 5/00
[52] U.S. Cl. .................... 370/85.1; 370/85.5; 370/85.8; 340/825.08; 340/825.54
[58] Field of Search ............... 370/13, 16, 16.1, 17, 370/56, 85.1–85.15, 94.1; 340/825.05, 825.06, 825.08, 825.16, 825.17, 825.5, 825.51, 825.54; 371/15.1, 16.1, 16.5, 18, 20.1, 20.6

[56] References Cited

U.S. PATENT DOCUMENTS

| | | | |
|---|---|---|---|
| 4,736,368 | 4/1988 | Szczepanek | 340/85.5 |
| 4,803,485 | 2/1989 | Rypinski | 340/825.05 |
| 4,887,075 | 12/1989 | Hirasawa | 340/825.5 |
| 4,941,089 | 7/1990 | Fischer | 370/85.13 |
| 5,111,452 | 5/1992 | Kyuma | 340/825.5 |
| 5,136,580 | 8/1992 | Videlock et al. | 370/85.13 |
| 5,151,895 | 9/1992 | Vacon et al. | 370/85.1 |

OTHER PUBLICATIONS

Black Box Catalog, Sep., 1991—MAU Controller Apparatus.

*Primary Examiner*—Douglas W. Olms
*Assistant Examiner*—Alpus H. Hsu
*Attorney, Agent, or Firm*—Dykema Gossett

[57] ABSTRACT

A method and apparatus is disclosed for selectively connecting network devices 22, 24 to a local area network 26. The apparatus and methodology of this invention 10, enables the devices 22, 24 to be connected to controllers 12, each of which have an output to a uniquely associated multi-station access units 14 and which allows the devices 22, 24 to be individually and selectively connected to the access unit 14. More particularly, the method and apparatus of the invention includes two computers 18, 12 which use voltage signals to selectively connect devices 22, 24 to access unit 14.

8 Claims, 7 Drawing Sheets

METHOD AND APPARATUS FOR THE CONTROL OF LOCAL AREA NETWORK MULTI-STATION ACCESS UNITS

1. FIELD OF THE INVENTION

This invention relates to a method and apparatus for the control of local area network multi-station access units and more particularly, to a method and apparatus for selectively allowing a workstation to access a local area network.

2. DISCUSSION

Local area networks are commonly used to allow communication between workstations and/or other types of computer devices, which are normally dispersed throughout a building or other location. Moreover, each of these devices is usually coupled or connected to a single multi-station access unit, which is connected to the local area network and which is adapted to selectively and communicatively connect the computer device to the local area network, effective to allow the device to communicate to other devices connected to the network.

While these multi-station access units have adequately and selectively connected the computer devices to the local area network, they are limited by the number of computer devices to which they may be connected. This device limitation has therefore resulted in the need for several multi-station access units to be dispersed throughout the entire local area network location, thereby causing support personnel to physically visit each of the multi-station access unit sites in order to ascertain faults; identify the current devices connected to the network by these access units; and to perform normal testing or maintenance procedures. In a large building, such dispersement has caused large amounts of wasted time and support resources. Moreover, this dispersement has added to the inefficiency of supporting and maintaining the overall local area network system.

SUMMARY OF THE INVENTION

It is therefore a primary object of this invention to provide an apparatus which allows each of the dispersed local area network multi-station access units to be centrally monitored and which further allows computer devices, placed on these individual access units, to be centrally and selectively connected to a local area network.

It is another object of this invention to provide a single apparatus which is adapted to remotely and selectively isolate each of the access units from the local area network in order facilitate remote testing of the units, effective to reduce network faults.

It is another object of this invention to provide a central apparatus which is further adapted to selectively and remotely prevent individual computer devices from accessing the local area network in order to facilitate testing, effective to reduce network errors.

It is yet another object of this invention to provide an apparatus which is adapted to be connected to the individual multi-station access units and which is further adapted to determine the existence of faults associated with the coupling between the apparatus and the individual access unit to which it is connected.

According to one aspect of the present invention, an apparatus is provided for use in combination with a workstation and a multi-station access unit, the access unit being adapted to connect the workstation to a certain local area network, effective to allow the workstation to communicate on the network. The apparatus comprises first computer means, coupled to the workstation and to the access unit, for allowing the access unit to connect the workstation to the network at a selected time; and second computer means, coupled to and remotely positioned from the first computer means, for defining the selected time and for communicating the defined selected time to the first computer means.

According to a second aspect of the present invention, a method is provided for controlling the connection of a plurality of workstations upon a local area network, each of the plurality of workstations being normally coupled to a unique one of a plurality of multi-station access units and at least one of said workstations being adapted to transmit a certain voltage signal effective, when received by a unit to cause the receiving unit to connect at least one of said workstations to a local area network, the method comprising the steps of:

breaking the connection between each of the multi-station access units and each of the respective workstations;

providing a computer adapted to receive the certain voltage signals from each of the plurality of workstations;

connecting each of the plurality of workstations to the computer;

connecting each of the multi-station access units to the computer; and allowing to the computer to selectively transmit a second signal to one of the multi-station access units in response to one of the received certain voltage signals, effective to allow one of the plurality of workstations to be selectively connected to the local area network.

Further objects, features, and advantages will become apparent from the consideration of the following description and the appended claims when taken in conjunction with the accompanied drawings.

DETAILED DESCRIPTION OF THE INVENTION

Figure 1:
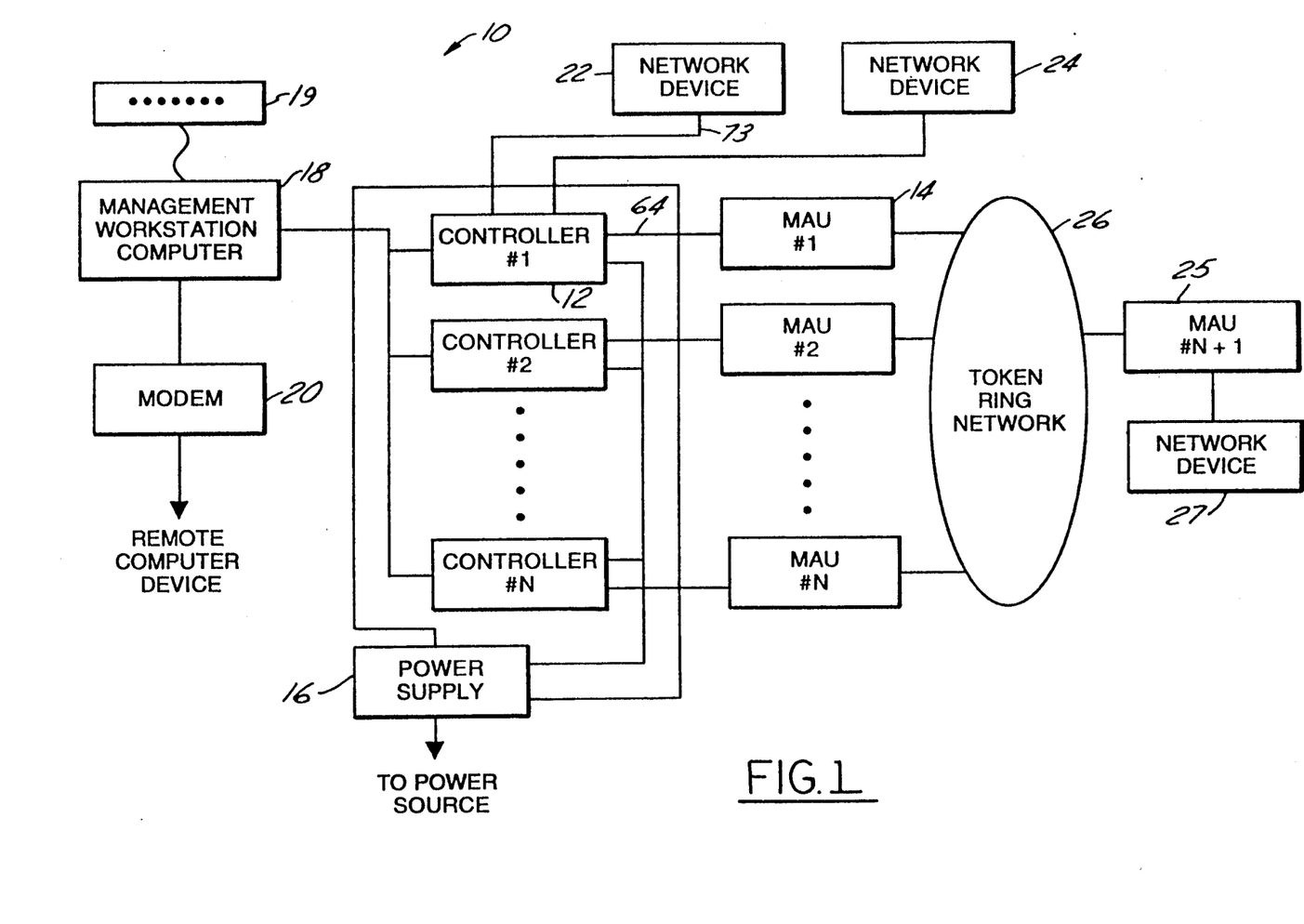
FIG. 1 is a block diagram of the apparatus of the preferred embodiment of the present invention shown in combination with several multi-station access units and a typical local area network.

Referring now to FIG. 1, there is shown multi-station access unit controller 10, made in accordance with the teachings of the preferred embodiment of this invention. As shown, multi-station access unit controller 10 includes several individual controllers 12 uniquely associated with and coupled to a single and typical multi-station access unit 14 (i.e. such as a Model 8228, manufactured by the IBM Corporation of Armonk, N.Y.). Moreover, multi-station access unit controller 10 further includes a power supply 16 having an input coupled to a typical power source (not shown) and having an output coupled to each of the individual controllers 12. Controller 10 further includes a management workstation computer 18 having an input coupled to a typical keyboard 19; a first output to a coupled to a typical modem 20; and a second output coupled to each of the individual controllers 12.

As further shown, each of the individual controllers 12 is coupled to typical computer devices 22, 24, alternatively comprising workstations, personal computers, or various other types of computing devices. Moreover, each of the access units 14 are coupled to a typical local area network 26, such as that associated with the 802.5 standard promulgated by the Institute of Electrical and Electronic Engineers (commonly referred to as "token ring"). It should be apparent to one of ordinary skill in the art that the controllers 12, according to this invention, are adapted to be electrically inserted between the various units 14 and devices 22, 24 when the normal electrical connection between devices 22, 24 and units 14 is broken. This normal connection is shown by unit 25 and device 27. In this manner, controllers 12 (under the direction of computer 18) selectively allows devices 22, 24 to be connected to units 14 in a manner which will be discussed.

Figure 2:
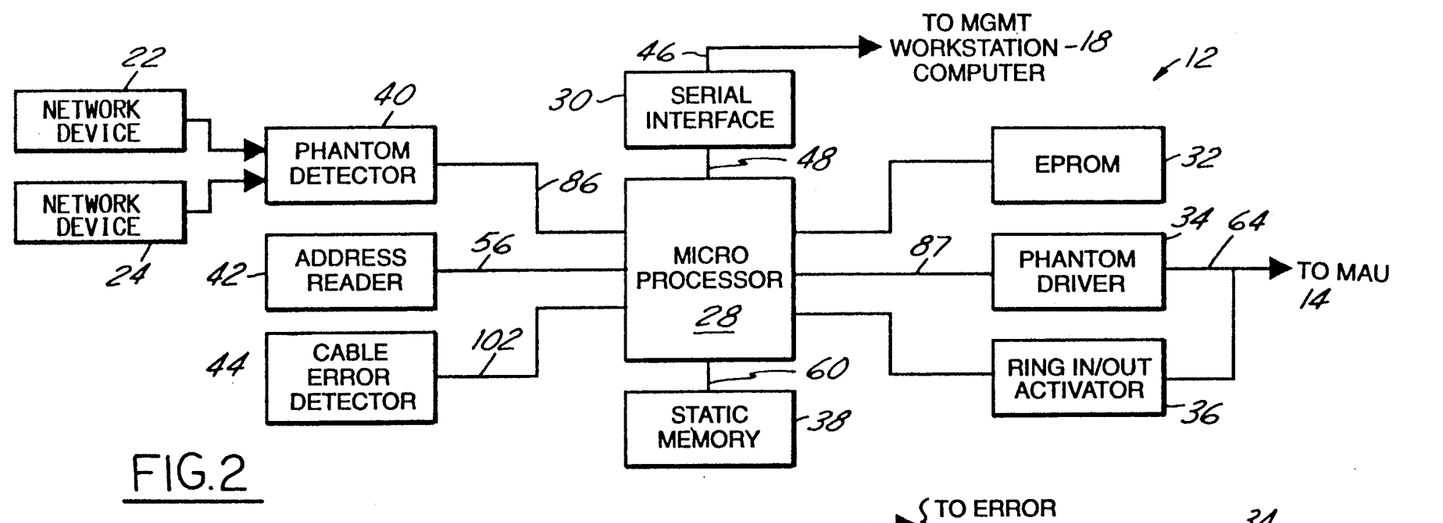
FIG. 2 is a block diagram of one of the controllers, made in accordance with the teachings of the preferred embodiment of this invention and generally shown in FIG. 1.

Referring now to FIG. 2, there is shown a block diagram of a typical controller 12. As shown, controller 12 comprises a microprocessor 28, adapted to operate under stored program control and which is coupled to a serial interface portion 30; an erasable programmable read only memory (EPROM) 32; a phantom driver portion 34, a "ring in/out activator" 36, a static memory portion 38; a phantom detector 40; an address reader 42; and a cable or bus error detector 44.

In operation, management workstation computer 18 transmits a series of serially formatted commands to microprocessor 28 by means of bus 46. These commands are received within the serial interface portion 30 and transmitted to microprocessor 28 by means of bus 48. The stored program that controls the operation of microprocessor is stored within memory 32, and defines the sequence and type of operations that microprocessor 28 is to perform, in combination with the received commands from computer 18.

Reader 42 defines the individual and unique address of controller 12 and enables microprocessor 28 to associate a received command with the unique address of the controller 12. Should this command not correspond to this address, microprocessor 28 is adapted to ignore the received command. Moreover, static memory 38 is adapted to contain the current state of the various flags and variables (which will be described later) in order to allow controller 12 to remain in the latest operational state during a power failure. In this manner, once power is restored, controller 12 will perform the next sequence of operations following the state that the controller 12 was in just prior to power failure.

Figures 6, 7, 8:
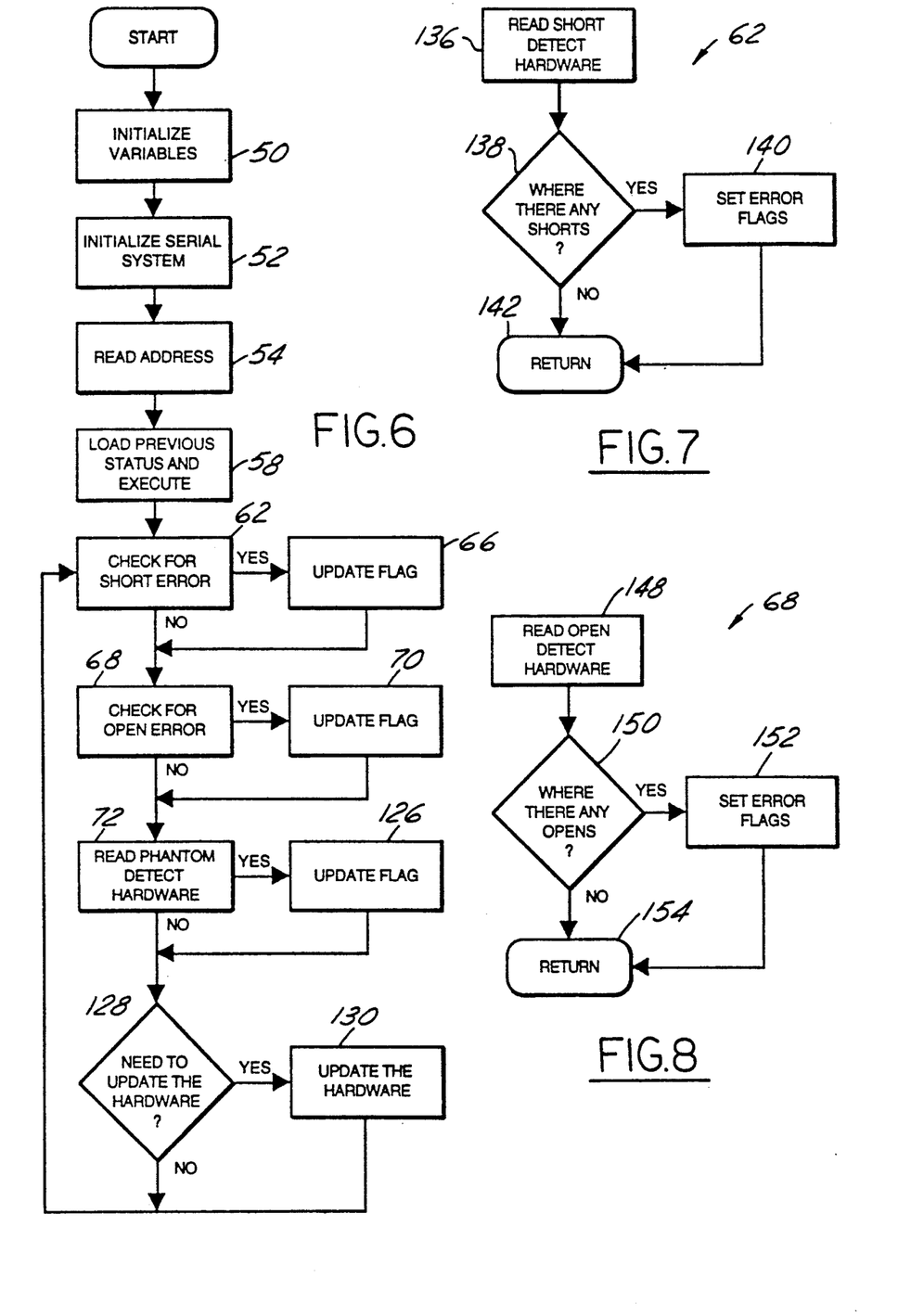
FIG. 6 is a flow chart illustrating the general sequence of operational steps associated with one of the controllers shown in FIGS. 1 and 2.
FIG. 7 is a flow chart illustrating the general sequence of operational steps associated with tile step entitled "Check for Short Error", shown in FIG. 6.
FIG. 8 is a flow chart illustrating the general sequence of operational steps associated with the step entitled "Check for Open Error", shown in FIG. 6.

In order to understand the operation of controller 12, reference is now made to FIGS. 1, 2, and 6-10 where the general sequence of operational steps and commands will now be explained. It should be apparent to one of ordinary skill in the art that these steps are uniquely defined, in type and sequence, by the stored program contained in memory 32 and the various commands emanating from computer 18. As shown in FIG. 6, microprocessor 28 begins operation with an initiation step 50 in which all of the variables and flags (which will be discussed) are initialized to a predefined state, necessary to ensure that microprocessor 28 begins operation in a known manner. This state may be arbitrarily selected arid, in the preferred embodiment, is defined to be the state in which all flags and variables have a null or logically zero value. Step 50 is then followed by step 52 in which the serial interface 30 is also initialized to a known or null state, in order to ensure that controller 12 does not begin operation with an erroneous or residual command.

Step 52 is followed by step 54 in which microprocessor 28 reads the address contained in reader 42 by means of bus 56. Step 58 follows step 54, in which microprocessor 28 reads the previous status (if any) contained within static memory 38, by means of bus 60. In this manner, step 58 ensures that microprocessor 28 responds to only commands addressed to it and performs the next sequence of operations that would have been previously accomplished, but for a power failure.

Step 58 is followed by step 62 in which controller 12 determines whether bus 64 (connecting controller 12 to access unit 14) is electrically shorted or faulted. If bus 64 is shorted, step 62 if followed by step 66 in which a "short detect flag" is set or given a logically high value. If no electrical short is detected, step 62 is followed by step 68 in which microprocessor 28 determines whether bus 64 is "electrically open" or faulted. Step 66 is also followed by step 68. If bus 64 is electrically open, step 68 is followed by step 70 in which an "electrically open" flag is set or given a logically high value. If no electrical open is found, step 68 is followed by 72 in which microprocessor 28 is adapted to read voltage signals received by phantom detector 40, in order to determine if a computer device 22, 24 desires to be connected to the network 26. Step 70 is also followed by step 72. In this manner, "short" or "open" faults associated with cable or bus 64 may be ascertained.

Figure 3:
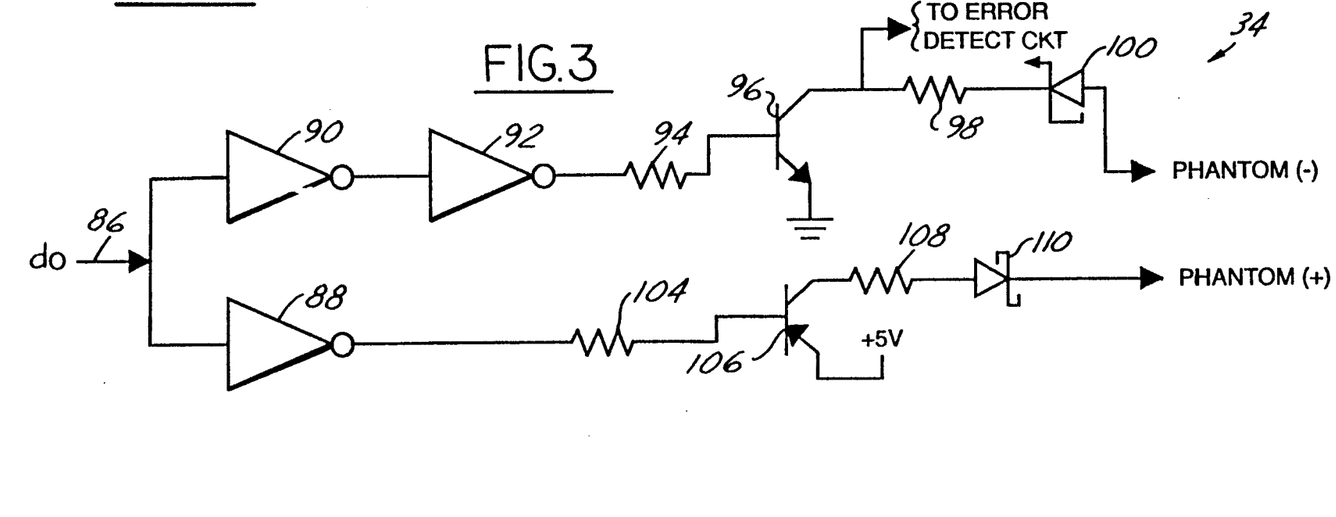
FIG. 3 is an electrical schematic diagram of the phantom driver portion of the controller shown in FIG. 2.
Figure 4:
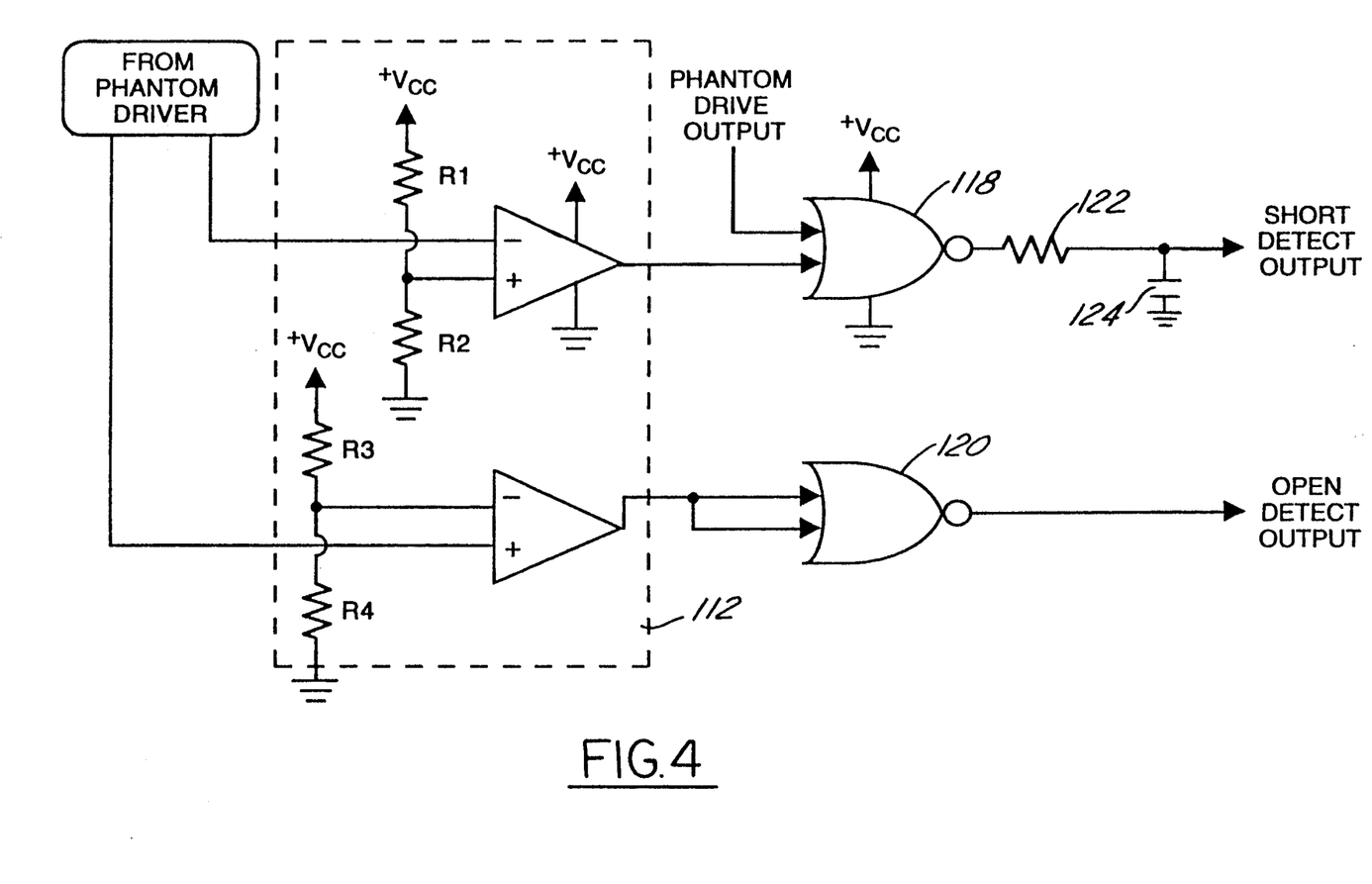
FIG. 4 is an electrical schematic diagram of the cable error detector portion of the controller shown in FIG. 2.
Figure 5:
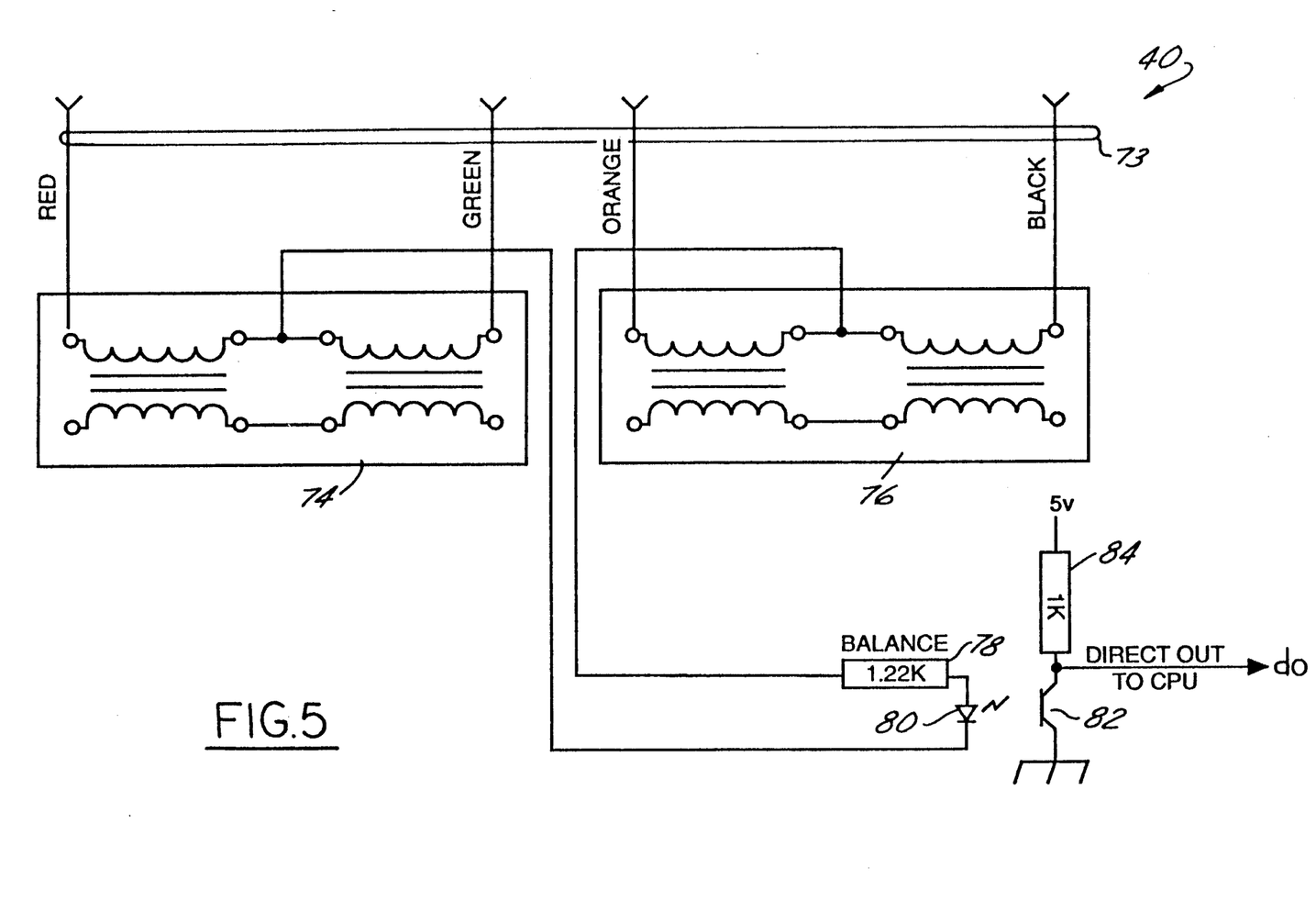
FIG. 5 is an electrical schematic diagram of the phantom detector portion of the controller shown in FIG. 2.

In order to understand the manner in which microprocessor 28 executes steps 62, 68, and 72, it is now necessary to refer to FIGS. 3-5. As shown in FIG. 5, phantom detector 40 receives the typical phantom voltage signals by means of bus 73. These voltage signals are typically generated by devices 22, 24 in order to request connection to network 26. It should be apparent to one of ordinary skill in the art that while detector 40 is adapted to receive "phantom voltage" signals corresponding to connection requests associated with a token ring network, detector 40 may be modified to receive and respond to other types of connect request voltage signals associated with other types of local area networks. Moreover, these "connect request" voltage signals are then input to typical electrical transformers 74, 76. The center tap of each of the transformers are coupled to opposite ends of a series arrangement of balancing resister 78 and a photo diode 80. Moreover, photo diode 80 is in electrical communication with transistor 82, adapted to have its collector coupled to a resistor 84 and its emitter coupled to electrical ground. A voltage signal of approximately +5 volts is coupled to resistor 84. In the preferred embodiment of this invention, resistors 78 and 84 respectively comprise 1.22 kΩ and 1 kΩ. In this manner, the voltage signal appearing on bus 46 is transferred to the collector of transistor 82. This signal is then sent to microprocessor 28 by means of bus 86, in order to inform microprocessor 28 of the fact that one of the devices 22, 24 desires or requests to be connected to network 26.

Upon receipt of this phantom or "connect request" voltage signal (communicated by use of bus 73), microprocessor 28 generates a signal to the phantom driver portion 34, by means of bus 87. Phantom driver portion 34 then generates a phantom voltage signal to the associated multi-station access unit 14 in order to allow connection of the requesting network device 22 or 24 to unit 14. This connection of requesting device 22 or 24 is effective to allow the requesting device 22, 24 to communicate upon network 26. Moreover, it should be apparent to one of ordinary skill in the art that if other types of local area networks are used, portion 34 is modified to reproduce the type of signal originally received by detector 40. While these other networks may require different types of connection request signals, the operational discussion described herein remains constant.

Thus, step 72 (FIG. 6) is performed by microprocessor 28 by use of phantom detector 14, shown and explained with reference to FIGS. 2 and 5. It should also be noted that microprocessor 28 may generate the "device connect signal" to driver 34, absent receipt of a signal from detector 40 in the event that computer 18 issues a command, by means of bus 46, to independently connect one of the devices 22, 24 to network 26. Moreover, computer 18 may inhibit this type of device connection even if such a phantom voltage signal is present on bus 73. Thus, it should be apparent that controller 12 is adapted to connect devices 22, 24 to unit 14 and to network 26 at a time selected by the devices 22, 24 or by computer 18.

Referring now to FIG. 3, there is shown phantom driver portion 34. As shown, the "connection request" voltage signal emanating from microprocessor 28 and placed upon bus 86 is concurrently input to a first inversion gate 88 and to a series connection of second and third inversion gates 90, 92. In this manner, two distinct pluralities of the original signal, appearing on bus 86 are created. The output of gate 92 is then input to a resistor 94 and the output of resistor 94 is coupled to the base of an emitter grounded transistor 96. The collector of transistor 96 is then input to a series arrangement of a resistor 98 and a diode 100. The output of diode 100 represents the positive plurality associated with the phantom or "connection request" voltage signal. Moreover, the output of the collector of transistor 96 is input into the error detector portion 44, by means of bus 102.

As further shown, the output of inversion gate 88 is input to a resistor 104. The output of resistor 104 is input into the base of a transistor 106, adapted to have its emitter coupled to a voltage source of approximately +5 volts and its collector coupled to a resistor 108. The output of resistor 108 is then coupled to a diode 110. The output of the diode 110 represents the negative plurality associated with the phantom voltage signal. In the preferred embodiment of this invention, resistors 94, 98, and 104 respectively comprise resistance values of 47 kΩ, 33Ω, 47kΩ, and 33Ω while diodes 100 and 110 each comprise 1N5170 types; transistor 96 comprises a 2N3904 type; and transistor 106 comprises a 2N3906 type. Moreover, the output signal of diodes 100 and 110 is placed upon bus 64 and transmitted to multi-station access unit 14. The transmitted signal is effective to cause signal receiving access unit 14 to connect to the requesting device 22, 24, thereby allowing the requesting device 22, 24 to be connected to the local area network 26. Alternatively, the signal is effective to cause unit 14 to connect to an identified (i.e. by computer 18) but non-requesting device 22, 24. Moreover, microprocessor 28 may also alternatively inhibit the transmission of the signal from driver 34 even though a device 22, 24 has requested connection. Such inhibition is, in the preferred embodiment of this invention, only done if directed by computer 18.

Referring now to FIG. 4, there is shown error detector portion 44 as comprising a window comparator portion 112 having an input coupled to the error detect output of portion 34 (see FIG. 3). Specifically, this input signal or voltage is a measure of the voltage appearing at the collector of transistor 96 and this voltage changes as the amount of phantom drive current (appearing upon bus 86) changes. As is obvious to one of ordinary skill in the art, if the voltage input to portion 112 exceeds a given ceiling amount (in the preferred embodiment this amount comprises approximately 286 mV) the outputs of operational amplifiers 114, 116, go respectively logically low and logically high. If the voltage signal input to portion 34 is low, then the output of NOR gate 118 is low; indicative of an electrical short condition or cable or bus 64. If the input signal drops below a given threshold level (in the preferred embodiment of this invention comprising approximately 40.5 millivolts), the outputs of amplifiers 114, 116 go respectively logically low and high. Moreover, if the voltage signal input to portion 34 is logically low, then the output of NOR gate 120 goes logically high, indicating an electrically open condition. If the voltage signal input to portion 112 falls within the voltage window between 40.5 and 286 millivolts, the outputs of amplifiers 114, 116 each go logically low, indicating a "normal" operational mode.

Moreover, in the preferred embodiment of this invention, a resistor 122 and a capacitor 124 are coupled to NOR gate 118 in order to filter out an approximately 2 millisecond pulse that is generated when the phantom voltage is first initiated by unit 14. This is known to be caused by the charging of the capacitors present in the typical multi-station access unit 14. Portion 44 may further be described with reference to the following truth table:

TABLE 1
TRUTH TABLE ASSOCIATED WITH ERROR DETECTOR

| OUTPUT OF AMP.-114 | OUTPUT OF AMP.-116 | PHANTOM DRIVE INPUT SIGNAL | SHORT DETECT OUTPUT | OPEN DETECT OUTPUT |
| --- | --- | --- | --- | --- |
| 0 | 0 | 0 | X | X |
| 0 | 0 | 1 | X | X |
| 0 | 1 | 0 | 1 | 0 |
| 0 | 1 | 1 | 0 | 0 |
| 1 | 0 | 0 | 0 | 1 |
| 1 | 0 | 1 | X | X |
| 1 | 1 | 0 | X | X |
| 1 | 1 | 1 | 0 | 0 | where:
0 = Logical Low Value
1 = Logical High Value
X = Don't Care Conditions

Thus, steps 62, 68, and 72 are performed by use of portions 34, 40, and 44, in the aforedescribed manner.

Turning back to FIG. 6, it is shown that if phantom voltage is detected by detector 40, a flag is updated in step 126. Alternatively, step 72 is followed by step 128 in which microprocessor 28 must determine whether the hardware associated with controller 12 must be updated. Such updating occurs only if a flag has been set in step 62, 70 or 126. Moreover, step 126 is also followed by step 128. If the hardware must be updated, step 128 is followed by step 130 in which microprocessor 28 updates the hardware. Alternatively step 128 is followed by step 62. It should be apparent to one of ordinary skill in the art that microprocessor 28 performs the sequence of steps 50-130 in the absence of interrupt commands from computer 18.

Referring now to FIG. 7, there is shown a flow chart illustrating and describing the sequence of steps associated with step 62 of FIG. 6.

The flow chart begins with an initial step 136 in which microprocessor 28 determines whether any shorts have been detected, by viewing or reading the update flags associated with step 66. Step 136 is then followed by step 138 in which microprocessor determines if there are any short flags set. If such flags are in existence, step 138 is then followed by step 140 in which microprocessor 28 sets or enables error flags. Step 140 is then followed by step 142 which causes microprocessor 28 to enter step 68. Step 138 is also followed by step 142.

Referring now to FIG. 8, there is shown a flow chart illustrating the sequence of steps associated with step 68, in FIG. 6. As shown, step 68 comprises an initial step 148 in which microprocessor 28 determines whether any previous electrical open conditions have been detected.

Step 148 is followed by steps 150 and 152 in which microprocessor 28 sets electrically open error flags, upon ascertainment of detected "open" errors. Step 152 is followed by step 154 which causes microprocessor 28 to perform step 72. Step 150 is also followed by step 154.

Figure 9:
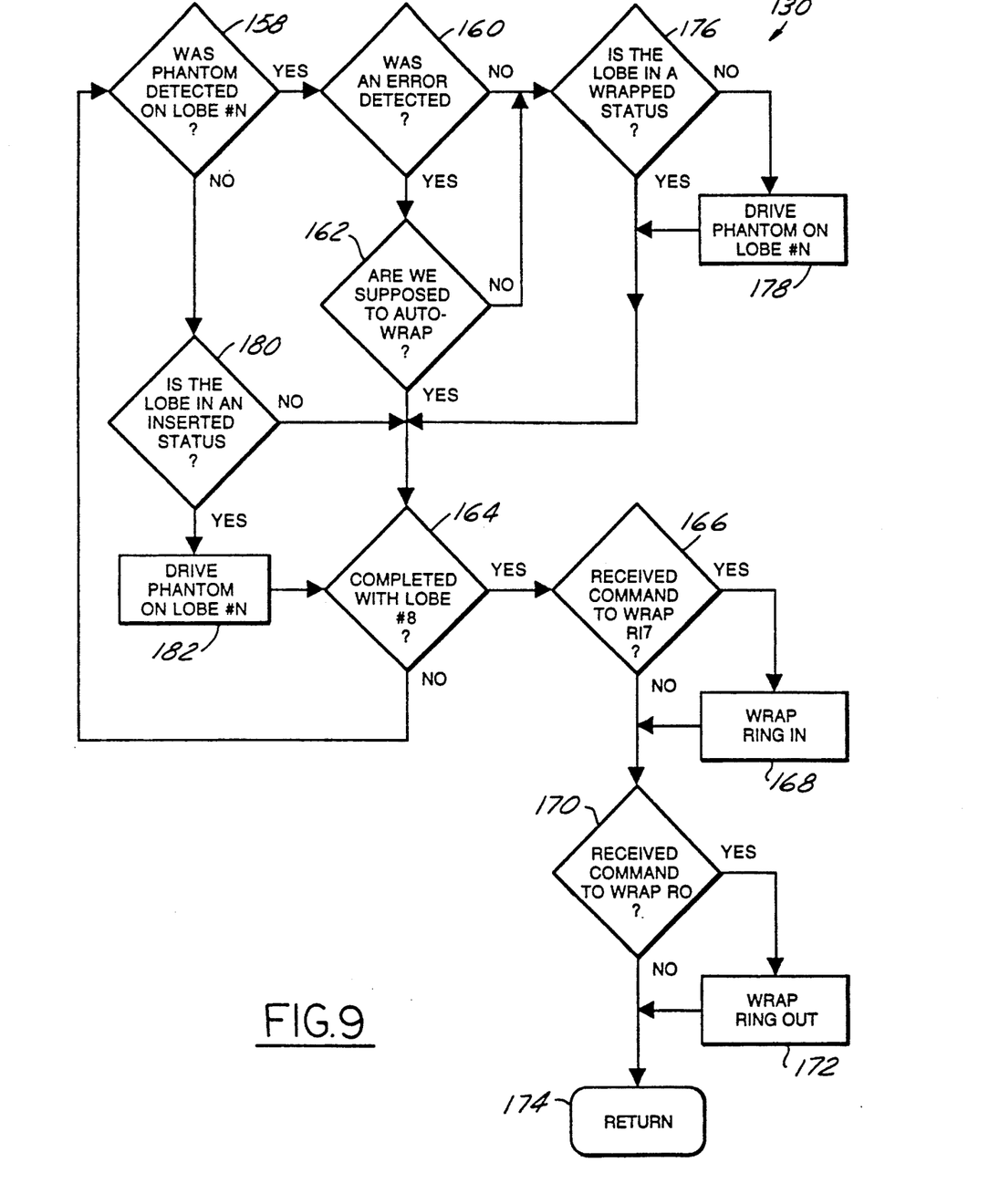
FIG. 9 is a flow chart showing the general sequence of operational steps associated with the step entitled "Update The Hardware", shown in FIG. 6.

Referring now to FIG. 9, there is shown a flow chart comprising the sequence of steps associated with the "update the hardware" step 130 of FIG. 6. As shown, step 130 comprises an initial step 158 in which microprocessor 28 must determine whether phantom or "connect request" voltage was detected from ally of the devices 22, 24. If this phantom voltage was detected, step 158 is followed by step 160 in which microprocessor 28 must determine whether any error condition, associated with steps 140 and 152, was detected. If such an error was detected, step 160 is followed by step 162 in which microprocessor 28 must determine whether a command has been issued from computer 18, to prevent the generation of a phantom signal to multi-station access unit 14. If such inhibition was ordered, step 162 is then followed by step 164 in which microprocessor 28 must determine whether all of the devices 22, 24 on its uniquely associated multi-station access unit 14 have been polled or interrogated. If all of the devices have been not been interrogated or considered, step 164 is then followed by step 158. Alternatively, step 164 is followed by step 166 in which microprocessor 28 must determine whether a command has been received, from computer 18 to disable the typical "ring in port" of the uniquely associated multi-station access unit 14. If such a command has been received, step 166 is followed by step 168 in which the "ring in" port is wrapped. Alternatively, step 166 is followed by step 170, in which microprocessor 28 must determine whether a command has been received from computer 18, to wrap the typical "ring out port" of the uniquely associated multi-station access unit 14. If such a command has been received, step 170 is followed by step 172, in which microprocessor 28 wraps the typical "ring out" port of multi-station access unit 14. Step 172 is then followed by step 174, which directs microprocessor 28 to perform step 62, as shown in FIG. 6. Moreover, steps 168 and 172 respectively are followed by steps 170 and 174.

If an error was not detected in step 160, microprocessor 28 enters step 176 in which microprocessor 28 must determine whether the individual device 22, 24 (from which phantom voltage is detected) is in a typical "wrapped status". If such a status is not present, step 176 is followed by step 178 in which microprocessor 28 allows a phantom voltage to be placed onto bus 64, by driver 34, effective to allow a connection to occur between that individual terminal device 22, 24, and the multi-station access unit 14. Alternatively, step 176 (as well as step 178) is followed by step 180 in which microprocessor 28 must determine whether the lobe is in an "inserted" status. Such inserted status is generated from computer 18 and sent to microprocessor 28 by means of bus 46. Step 180 is then followed by step 182 in which microprocessor 28 allows phantom voltage to be placed upon bus 64, by driver 34. Step 182 is then followed by step 164.

Figure 10:
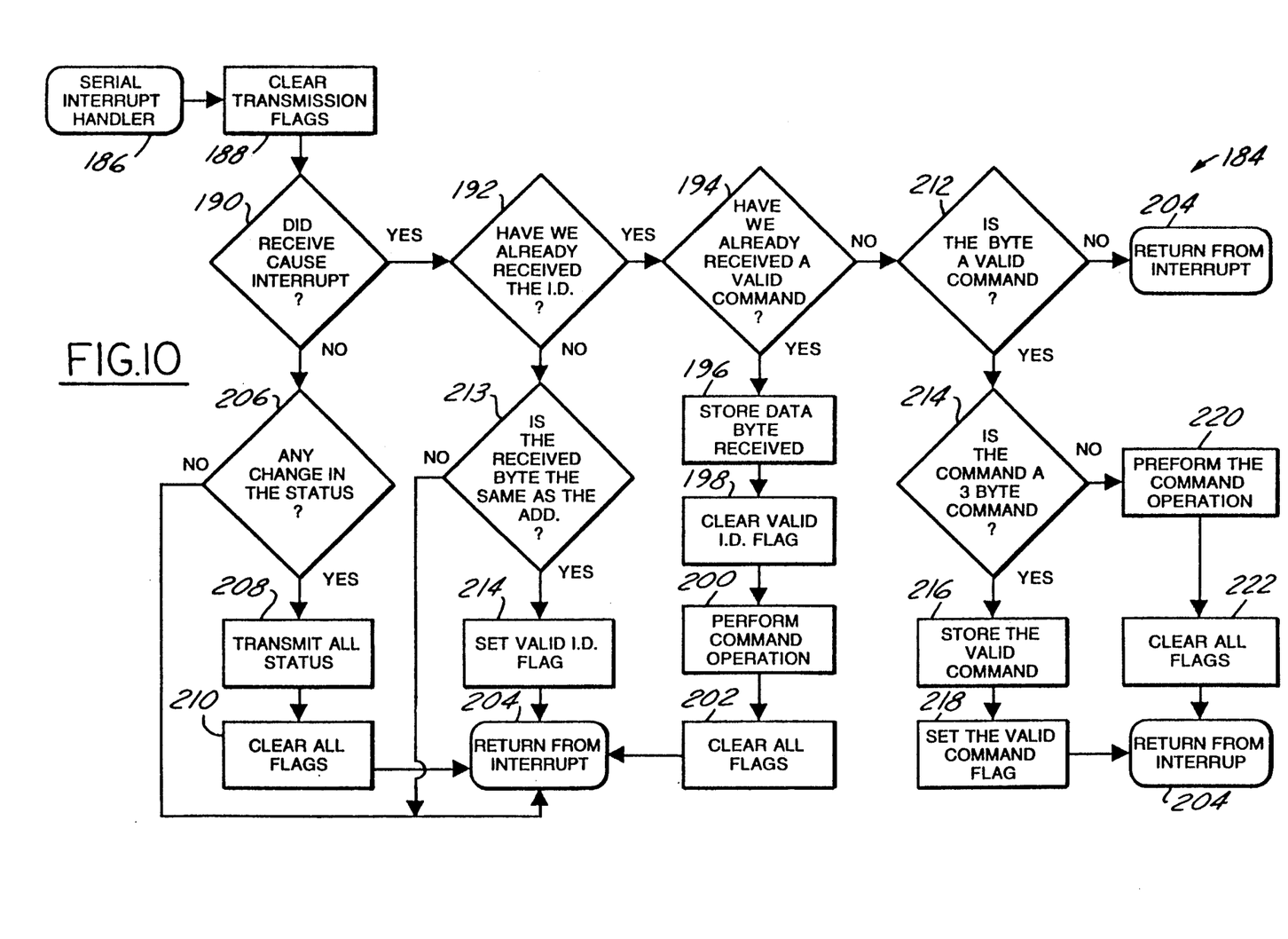
FIG. 10 is a flow chart illustrating the general sequence of operational steps associated with the transmission of commands from the management workstation computer to each of the controllers, according to the teachings of the preferred embodiment of this invention.

Referring now to FIG. 10, there is shown a flow chart 184, comprising a sequence of steps associated with the transmission and reception of interrupting commands from computer 18, to controller 12. As shown in initial step 186, an interrupt signal is first sent (from computer 18) to interface 30, along bus 46. This signal is effective to cause microprocessor 28 to stop the operations listed in and explained with reference to FIGS. 6–9 and instead to perform a commanded operation. Step 186 is then followed by step 188 in which all transmission flags are cleared (i.e. set to a value of logical zero), by microprocessor 28. In the preferred embodiment of this invention, there are two such transmission flags. One of these flags denotes that data has been received by microprocessor 28 while the other denotes a transmission of data from microprocessor 28. Step 188 is then followed by step 190 in which microprocessor 28 determines whether the received command caused the interrupt. If the received command did cause the interrupt, step 190 is then followed by step 192 in which microprocessor 28 must determine whether the unique address associated with controller 12, has been received. If this address has already been received, step 192 is then followed by step 194, in which microprocessor 28 must determine whether a valid command has already been received. If, in step 194, a valid command has already been received, step 194 is the followed by step 196, in which microprocessor 28 is directed to store the data byte(s) received.

Step 196 is then followed by step 198 in which the "I.D. valid" identification flag is clear. This "I.D. valid" flag, in the preferred embodiment of this invention denotes the receipt, by microprocessor 28, of a correct address. Step 198 is then followed by step 200 in which microprocessor 28 performs the received command. Step 200 is then followed by step 202 in which all of the flags have been cleared (i.e. set to a logically low value). Step 202 is then followed by step 204, in which microprocessor 28 is directed to return to the operation that it would have performed had it not received the interrupt command. These operations are shown in FIGS. 6-9 and have already been explained.

If, in step 190, the received command did not cause the interrupt, step 190 is then followed by step 206 in which microprocessor 28 must determine whether a change in status has occurred. If such a change has occurred, step 206 is followed by step 208 in which microprocessor 28 transmits the status or value of all of the aforedescribed flags, by means of serial interface 30 and bus 46, to computer workstation 18. Step 208 is then followed by step 210 in which all of the flags have been cleared (set to logical zero). Moreover, it should be apparent to one of ordinary skill in the art that this aforementioned "change in status" denotes a change in value of one of the aforedescribed flags and that such changes also cause the interruption of the "normal mode" of operation shown and described with reference to FIGS. 6-9. Step 210 is then followed by step 204. Step 206 is alternatively followed by step 204 in the event that no change in status occurred.

If, in step 194, a valid command has not been received, step 194 is then followed by step 212, in which microprocessor 28 determines whether the received byte is a valid command. If such a valid command has not been received, step 212 is then followed by step 204. Alternatively, step 212 is then followed by 214, in which microprocessor 28 determines whether the commands is a three-byte command. If the command is a three-byte command, step 214 is then followed by step 216, in which microprocessor 28 stores the valid command. Step 216 is then followed by step 218, in which the "command" flag is set, indicating the receipt of a valid command. In the preferred embodiment of this invention, all valid commands are initially stored within controller 12. Each received command is then compared against this store in order to determine the existence of a valid command. Step 218 is then followed by step 204.

If, in step 214, the existence of a three-byte command has not been determined, step 214 is then followed by step 220, in which microprocessor 28 is directed to perform the commanded operation. Step 220 is then followed by step 222 in which all of the flags are cleared (i.e. set to a logically low value). Step 222 is then followed by step 204. Moreover, if microprocessor 28 had not already received the address in step 194, it enters step 213 in which it must determine if the received byte is the same as the address. If the received byte is the address, step 213 is followed by step 214 in which the "valid I.D." flag is set (put at a logically high value).

Step 214 is followed by step 204. Alternatively, step 213 is followed by step 204.

In this manner, commands may be generated by workstation 18, to the individual controllers 12, in order to allow microprocessor 28 to perform the desired operation. Moreover, the commands associated with the preferred embodiment of this invention comprise inserting a device upon the network; isolating or wrapping the device from the network; activating the "ring-in" or "ring-out" multi-station access unit features, identification of speed of data transmission to the multi-station access unit, "release control" which allows devices 22, 24 to become electrically connected to unit 14 without interruption and requesting device status. Moreover, a flag is associated with the activation of the "ring-in" and "ring-out" features, a flag associated with each "wrap" or "insert" command, as well as the aforedescribed flags.

It should also be apparent to one of ordinary skill in the art that computer 18 is adapted to remotely and centrally control the connection of each device 22, 24 to the network 26 and that, by use of modem 20, a computer (remote from computer 18) may further effectuate this control.

It is to be understood that the invention is not limited to the exact construction or method illustrated and described above, but that various changes and modifications may be made without departing from the spirit and scope of the invention as defined in the following claims.

We claim:

1. A controller for use in combination with a multi-station access unit and a plurality of workstations for controlling the connection of said plurality of workstations upon a local area network, said controller comprising:
   first computer means, coupled to said access unit and to said plurality of workstations for receiving a first voltage signal from at least one of said plurality of workstations and for selectively transmitting a second voltage signal, to said access unit effective to cause said access unit to connect said at least one of said plurality of workstations to said local area network; and
   second computer means, coupled to said first computer means, for selectively preventing said second voltage signal to be transmitted by said first computer means and for selectively causing said access unit to connect said at least one of said plurality of workstations to said local area network in the absence of said first voltage signal.

2. The controller of claim 1 further comprising a cable adapted to couple said first computer means to said access unit.

3. The controller of claim 2, wherein said first computer means is further adapted to determine the existence of faults associated with said cable, thereby ensuring the receipt of said second voltage signal by said access unit.

4. The controller of claim 3, wherein said first computer means is further adapted to determine the identify of said at least one of said plurality of workstations connected to said local area network.

5. The controller of claim 4, wherein said local area network comprises a token ring network.

6. The controller of claim 5, wherein said access unit is connected to said token ring network, said first computer means being further adapted to selectively break said connection between said token ring network and said at least one of said plurality of workstations.

7. A method for controlling the connection of a plurality of workstations upon a local area network, each of said plurality of workstations being normally coupled to a unique one of a plurality of multi-station access units and adapted to transmit a first voltage signal, said method comprising the steps of:

breaking said connection between each of said access units and each of said respective workstations;

providing a computer adapted to receive said first voltage signals from each of said plurality of workstations;

connecting each of said plurality of workstations to said computer;

connecting each of said access units to said computer; and allowing said computer to selectively transmit a second voltage signal to one of said access units in response to one of said received first voltage signals, effective to allow one of said plurality of workstations to be selectively connected to said local area network.

8. An apparatus for use in combination with a network device, a local area network, and a multi-station access unit for controlling the connection of said network device upon said local area network, said network device selectively generating a connect request signal, said apparatus comprising:

controller means connected to said multi-station access unit and to said network device for preventing said multi-station access unit from receiving said connect request signal and for generating a device connect signal to said multi-station access unit, in the absence of said connect request signal, effective to cause said multi-station access unit to connect said network device to said local area network;

a cable connecting said controller means to said multi-station access unit; and fault detection means, connected to said controller means, for determining electrical faults associated with said cable, thereby ensuring the receipt of said device connect signal by said multi-station access unit.

* * * * *